(12) United States Patent
Fanelli

(10) Patent No.: US 7,100,993 B2
(45) Date of Patent: Sep. 5, 2006

(54) INDEPENDENT HEATING SYSTEM FOR MOTOR VEHICLE PAYLOAD

(76) Inventor: Leonard Fanelli, 1601 Locust Ave., Bohemia, NY (US) 11716

(*) Notice: Subject to any disclaimer, the term of this patent is extended or adjusted under 35 U.S.C. 154(b) by 0 days.

(21) Appl. No.: 10/995,890

(22) Filed: Nov. 23, 2004

(65) Prior Publication Data

US 2006/0108856 A1    May 25, 2006

(51) Int. Cl.
*F02B 75/10*    (2006.01)

(52) U.S. Cl. .................................................. 298/1 H
(58) Field of Classification Search ............... 298/1 H; 237/12.3 A, 12.3 C
See application file for complete search history.

(56) References Cited

U.S. PATENT DOCUMENTS 3,664,706 A * 5/1972 Chant ..................... 298/1 H
3,695,708 A * 10/1972 Vincenty ................. 298/1 H
5,235,762 A * 8/1993 Brady
5,988,935 A * 11/1999 Dillingham

* cited by examiner

*Primary Examiner*—Stephen Gordon
(74) *Attorney, Agent, or Firm*—Stephen E. Feldman

(57) ABSTRACT

A dump body heater according to an embodiment of the present invention blows hot air into the dump body, heating the body and preventing material from freezing to the body in cold weather. Prior art systems typically use the exhaust system of the truck by diverting the exhaust heat into the dump body.

5 Claims, 1 Drawing Sheet

INDEPENDENT HEATING SYSTEM FOR MOTOR VEHICLE PAYLOAD

FIELD OF THE INVENTION

The present invention relates to roadway repair systems and more particularly to a novel wheeled, motor driven vehicle having means for maintaining a payload content stored therein in at a certain temperature regardless of the use or non-use of the vehicle.

BACKGROUND OF THE INVENTION

It is well-known to provide heating systems for the payload area of trunk-type vehicles. For example, heating the payload-bearing area of a dump truck also known as the dump truck body.

Typical systems merely divert the truck's exhaust into the dump truck body or underneath it to heat the body itself. The exhaust gas is not usually hot enough and loses too much heat before getting to the dump truck body to effectively heat the payload area. Uneven heating and freezing of the payload are usually the result. In addition, new motor vehicle emission laws are making it more difficult to use the prior art exhaust systems. U.S. Pat. No. 5,893,711 to Vogelzang et al. and U.S. Pat. No. 5,988,935 to Dillingmah. Neither patent, however, discloses an independent, distinct and separate heating system for the payload area of a vehicle.

SUMMARY OF THE INVENTION

A dump body heater according to an embodiment of the present invention blows hot air into the dump body, heating the body and preventing material from freezing to the body in cold weather. Prior art systems typically use the exhaust system of the truck by diverting the exhaust heat into the dump body.

In further detail, the present invention provides an independent dump truck body heating system comprising a burner, an independent fuel line operably connected to the burner, and a heat transfer box. The burner is constructed and arranged to feed heat into the heat transfer box and the heat transfer box is constructed and arranged to feed heat to a dump truck body.

In accordance with further aspects of a preferred embodiment of the present invention, the burner is an oil-fired burner; the system may further comprise a battery operably connected to the burner and a switch operably connected between the battery and the burner; or a duct connected between the heat transfer box and the dump truck body.

DETAILED DESCRIPTION

Figure 1:
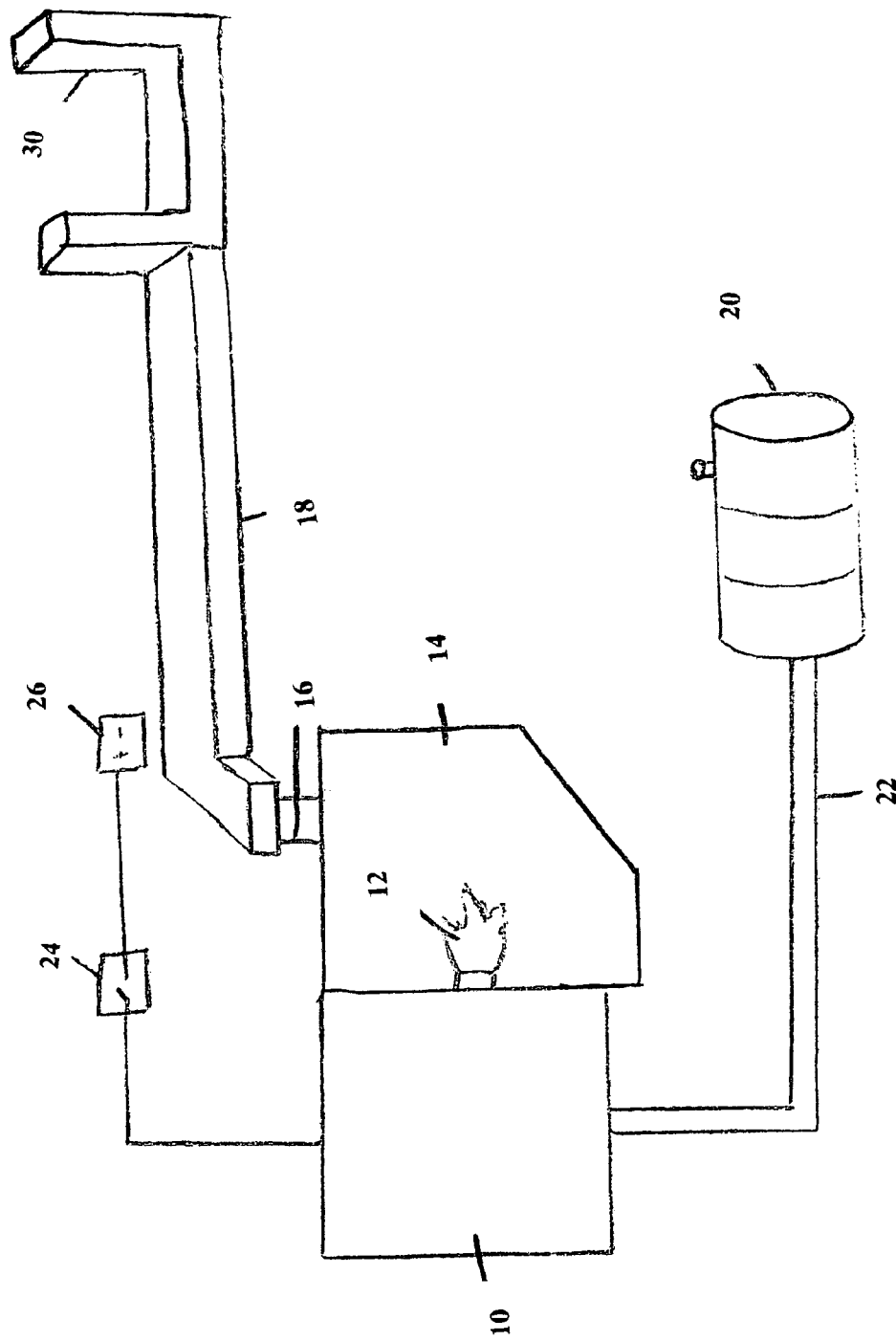
FIG. 1 is a schematic diagram of a dump truck heater in accordance with an embodiment of the present invention.

A dump body heater according to an embodiment of the present invention blows hot air into the dump body, heating the body and preventing material from freezing to the body in cold weather. Prior art systems typically use the exhaust system of the truck by diverting the exhaust heat into the dump body.

The present invention provides an independent heating system comprising a burner that blows flames into an insulated, ceramic box unit. The heated air in the box will then be used to heat the dump truck body.

FIG. 1 shows a dump truck body heating system according to a preferred embodiment of the present invention. Fuel is fed to a burner 10 from the truck's gas tank 20 via a separate and independent fuel line 22. Separate and independent meaning the fuel line 22 should be separate from and independent of the fuel line and fuel transport system for the engine.

The burner is controlled via a switch 24 connected between the burner and the vehicle's battery 26. The switch 24 should be located in the cab of the truck for convenient operation by the driver.

The burner 10 is switched on and off by switching current to the burner 10 on an off in the regular and customary way that switches normally work. In other words, turning the switch 24 on conducts current to the burner 10 from the battery 26, supplying the power necessary to operate the burner.

As is well-known, the burner 10 uses the electricity from the battery 24 to ignite a spark and burn fuel, creating a flame 12. The flame 12 heats air in a heat transfer box 14. The transfer box 14 should be lined with a heat resistant material, such as a lining or tile to trap, and keep, the heat in the box 14.

The resulting heated air in the transfer box 14 is sent out of the box 14 through a through a duct, or. pipe 18 via a tube 16.

Preferably, the duct or pipe 18 is positioned under the dump truck body 30 so that the heat from the hot air traveling through the duct 18 will rise up, into the dump truck body 30 and radiate upwardly through the entirety of the dump truck body 30.

The dump truck body heating system according to the present invention and disclosed above is operable independent of the truck itself. The system is independent, distinct, and separate from all other systems and each of the constituent parts of the dump truck into which the system is installed.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A truck having an engine and an independent dump truck body heating system comprising:
    a burner;
    a fuel source, said fuel source being shared between the engine and the heating system;
    an independent fuel line operably connected between the fuel source and the burner; and a heat transfer box, said heat transfer box being lined with a heat resistant material;

wherein:

the burner is constructed and arranged to feed heat into the heat transfer box and the heat transfer box is constructed and arranged to feed heat to a dump truck body.

2. The truck and dump truck body heating system of claim 1 wherein the burner is an oil-fired burner.

3. The truck and dump truck body heating system of claim 1 further comprising a battery operably connected to the burner.

4. The truck and dump truck body heating system of claim 3 further comprising a switch operably connected between the battery and the burner.

5. The truck and dump truck body heating system of claim 1 further comprising a duct connected between the heat transfer box and the dump truck body.

* * * * *